United States Patent [19]

Pauli

[11] 4,040,757
[45] Aug. 9, 1977

[54] DRIVE COUPLING

[75] Inventor: Ernest H. Pauli, Watchung, N.J.

[73] Assignee: The Hilliard Corporation, Elmira, N.Y.

[21] Appl. No.: 557,826

[22] Filed: Mar. 12, 1975

Related U.S. Application Data

[63] Continuation-in-part of Ser. No. 286,346, Sept. 5, 1972, Pat. No. 3,884,049.

[51] Int. Cl.² .............................................. F16B 3/00
[52] U.S. Cl. .................................... 403/356; 403/362; 64/14
[58] Field of Search .................. 403/362, 356, 365; 16/121; 64/14

[56] References Cited

U.S. PATENT DOCUMENTS

| 1,526,500 | 2/1925  | Kasch    | 403/362   |
|-----------|---------|----------|-----------|
| 1,649,895 | 11/1927 | Gade     | 403/362 X |
| 2,079,460 | 5/1937  | Marty    | 403/362 X;362 |
| 2,804,759 | 9/1957  | Hartmann | 403/362   |
| 2,830,445 | 4/1958  | Kressin  | 64/14     |
| 3,030,131 | 4/1962  | Scherry  | 403/362   |
| 3,313,057 | 4/1967  | Leddy    | 16/121 X  |
| 3,396,556 | 8/1968  | Giegerich| 64/14     |
| 3,552,145 | 1/1971  | Barton et al. | 64/14 |
| 3,708,243 | 1/1973  | Wooden   | 403/362   |

Primary Examiner—Andrew V. Kundrat
Attorney, Agent, or Firm—Melford F. Tietze

[57] ABSTRACT

A flexible drive coupling for power transmission shafts having coupling elements of plastic material containing improved metal elements therein to form strengthened locking means for securing the coupling elements on the coupled transmission shafts.

2 Claims, 10 Drawing Figures

DRIVE COUPLING

BACKGROUND OF THE INVENTION

This application is a continuation-in-part of my co-pending application, Ser. No. 286,346, filed Sept. 5, 1972, now issued in U.S. Pat. No. 3,884,049. Divisional subject matter of the application also appears herein.

Considerable difficulty has been encountered in providing flexible drive couplings of simple and effective design and operation and reasonable cost. Such couplings must have the capability of accommodating reasonable non-alignment between the shaft members to be coupled and be substantially trouble-free over extended periods of operation. There are a vast number of products that utilize motors and/or power transmission shafts and the need for such coupling means is virtually endless.

Certain types of flexible coupling devices employ screw or clamp fastening devices for securing the coupling elements to their respective shafts. However, the vibration and longitudinally opposing forces acting on such members tend to eventually loosen them or materially reduce their efficient operation. When such members become loose or even slightly out of proper operative position, heat and friction quickly ensue causing failure or interruption of service.

A particularly troublesome problem of this nature exists in connection with drive shafts of relatively small diameter. Such shafts are frequently employed in small mechanical installations in which low cost is particularly significant. Systems of such kind, also, often are fabricated in large-scale, production-line type manufacturing installations placing a premium on simplicity of installation.

OBJECTS AND BRIEF SUMMARY OF THE INVENTION

Accordingly, it is an abject of this invention to provide a flexible drive coupling device of simple and low-cost design which is effectively resistant to loosening during operation.

A further object of the invention is to provide such a coupling device made of a plastic material, of which the component interchangeable elements may be molded and require a minimum of machining.

A still further object of this invention is to provide a plastic flexible coupling device comprising plastic coupling members received on the ends of the shafts to be coupled, said coupling members having metal members housed therein and radially-extending screw means threadedly transversing said metal member and operable to lockingly engage said shaft and secure said coupling member thereon.

BRIEF DESCRIPTION OF THE DRAWINGS

A preferred embodiment of the invention is shown in the accompanying drawings in which.

DESCRIPTION OF PREFERRED EMBODIMENT

Figures 1, 2:
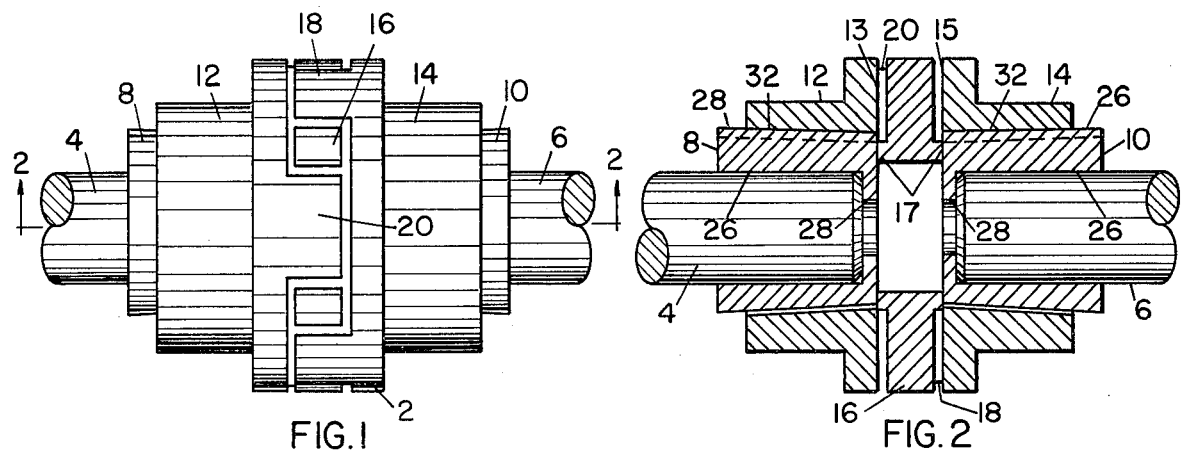
FIG. 1 is a side elevation view of a flexible coupling mounted on and forming a drive coupling between two adjacent shafts.
FIG. 2 is a longitudinally cross-section view taken along the tine 2—2 in FIG. 1 and looking in the direction of the arrows.

A flexible drive coupling 2 according to one preferred embodiment of the invention is shown in FIG. 1 forming a power transmission coupling between a drive shaft 4 and a driven shaft 6. The coupling comprises bushing members 8 and 10 which are received respectively on the shafts 4 and 6 and coupling heads 12 and 14 mounted on the bushings. The numeral 16 identifies a spoke-shaped spacer element interposed between the projecting lugs 18 and 20 of the coupling heads through which the driving force is transmitted from one coupling head to the other and hence from drive shaft 4 to shaft 6.

The bushings 8 and 10 may be keyed to their shafts in conventional registered slots in their respective shafts and bushings, or the keys may be supplemented or replaced by threaded screw means as hereinafter described. Each bushing has an inner cylindrical bore 26 as seen in FIG. 2 in which the ends of the shafts are received. The ends of the bores 26 have lips 28 which form an abuttment with the ends of the shafts and prevent the bushings from moving further onto their respective shafts. The outer surfaces 30 of the bushings are divergently tapered so as to flare outwardly away from the adjacent ends of the shafts 4 and 6. Such taper amy be from 5½° to 8° from axial, and about 6° is particularly effective.

The coupling heads 12 and 14 have corresponding inner tapered bores 32 shich are adapted to be received on the tapered surfaces 30 of their respective bushings. The heads may be rotationally locked on the bushing by keys. The projecting lugs 18 and 20 on the coupling head comprise three in number. More such lugs may be used if desired particularly in association with larger diameter shafts and correspondingly larger coupling heads. With the shafts in operative juxtaposition, the lugs are in overlapping relation. The spacer member 16 is a spoke-shaped member having a cylindrical body 16' and a series of radially projecting spokes 17 (Six lugs corresponding to the six spaces between the overlapping lugs 18 and 20. An annular rib 17' protrudes on each end of the spacing member and serves to space the end faces from the adjacent end faces of bushings 8 and 10 and the flush end faces 13 and 15 of the coupling heads when the assembly is mounted for operation. Such provision in coupling means embodying a compressible material between the coupling elements is well-known. By warrant of a construction such as that hereinabove described, the shafts and consequently, the coupling members respectively mounted thereon may be in slight misalignment so as to thereby accommodate the frequently encountered situation where such adjacent shaft members are not normally in perfect axial alignment. The permitted angulation between the coupling heads as they rotate resulting from the ability to transmit the driving force through the overlapping lug members 18 and 20 and the interposed compressible spacer member 16, makes such accommodation of misalignment possible.

A more detailed illustration and description of such a coupling arrangement may be found in my copending application, Ser. No. 286,346, now U.S. Pat. No. 3,884,049.

The bushing and coupling head elements of the coupling 2 are preferably made of plastic material suitable for molding to produce a substantially dense dimensionally stable and relatively strong molded part. Suitable plastic materials for such use include lexan (a poly carbonate) and nylon, although other conventionally available plastic materials having such suitable properties may be employed.

The tapered bores 32 each have a series longitudinally extending ribs 34 substantially uniformly spaced around the interior thereof. The ribs follow the contour of the tapered bore and hence converge slightly toward the reduced end of the bore. Such ribs maintain rotational stability between the two molded plastic parts in engagement. It is believed that each rib is capable of being resiliently deformed individually according to the localized stress imparted thereto when the coupling head is mounted on the bushing member. Such deflection accommodates minor distortion of the molded parts while enabling a secure and uniform fitting of the pieces. Additionally, the resilient deformation of the ribs as axial thrust is imparted on the coupling head member enhances the frictional locking engagement between the tapered surfaces.

In use, the bushings 8 and 10 are placed on the ends of their respective shafts with the lip portions 28 of the bushings engaging with the ends of each of the shafts. The coupling heads are then placed on the respective bushings and pressed so as to form a relatively tights fit on the outer tapered surface of the bushings. The spider member 16 is then arranged so as to fill the gaps between the overlapping driving lugs of the coupling heads as seen in FIG. 1 and the shafts secured in their desired operative positions. It will be appreciated that under normal circumstances, the shafts will generally not be in perfect alignment. Consequently, the coupling heads will have a slight angular relationship to one another which, during operation, results in an axial thrust tending to force apart the respective halves of the coupling connection. Such separating thrust acting substantially equally and oppositely on the coupling heads 12 and 14 is resisted by the respective bushings 8 and 10 which are held in a fixed relationship to their respective shafts. Consequently, such thrust serves to further increase the tightening force acting between the bushing and its coupling head. It will be noted that despite any slight further change in alignment or wear between the coupling heads or between the respective bushings and their coupling heads, that the separating thrust will merely serve to maintain a desired firmness in the driving connection between the parts. Such action is characteristically different from that which results in similar coupling devices relying upon screws and similar fastening devices which have no provision for accommodating looseness or play that may develop during use.

There are circumstances in which the coupling member carried at the ends of the respective shafts are advantageously secured thereon by the use of threaded locking screws. Such screws may supplement the usual key-type connection in which case it serves primarily to secure the coupling member in longitudinal dimension, or it may be used alone without a key connection in which it serves both functions. In either case the plastic material of which the coupling member is advantageously made for the purposes of the present invention is not sufficiently strong to effectively secure such locking screws against the forces exerted thereon during use. The threads typically will either strip under the attempted tightening stress or will fatigue and loosen during use. This characteristic has been a major obstacle to the beneficial and advantageous use of molded plastic coupling members for drive transmissions. According to the feature of the present invention, however, these obstacles are effectively overcome by employing a unique metal element embedded in the plastic coupling member to furnish the needed strength.

Figures 3, 5:
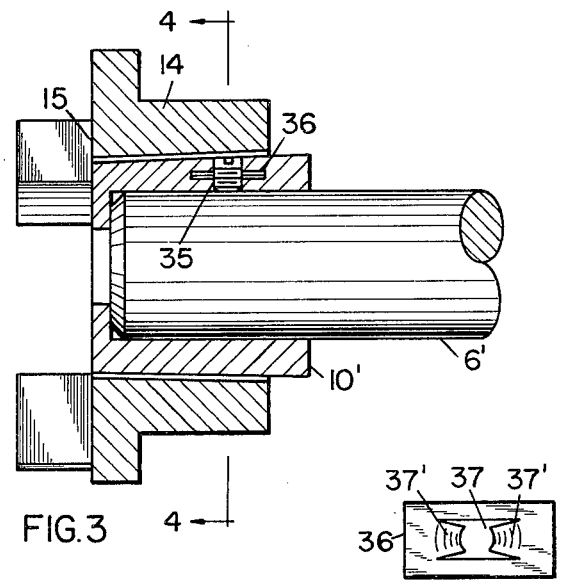
FIG. 3 is a longitudinal cross-sectinal view of the coupling members for one shaft as seen in FIG. 2 showing one embodiment of means for securing the coupling member on the shaft.
FIG. 5 is a plan view showing a locking nut employed in FIGS. 3 and 4.
Figure 4:
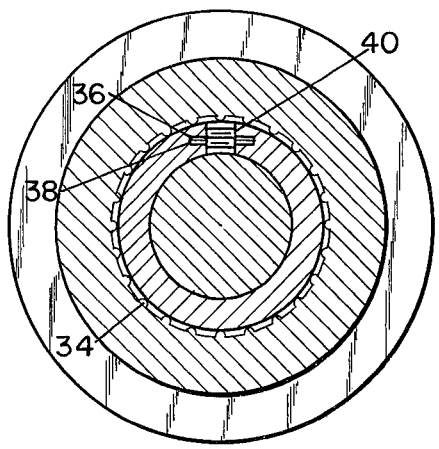
FIG. 4 is a transverse sectional view taken along the line 4—14 in FIG. 3 looking in the directions of the arrows.

One embodiment of such feature is shown in FIGS. 3 and 4 in which a set screw is utilized to secure the inner bushing member 10' on its shaft member 6'. Inasmuch as the plastic material of which the bushing 10' is made is not entirely satisfactory for withstanding the localized stress imparted by threaded engagement of the screw, an insertable lock nut device 36 is utilized to receive the screw. As seen in FIG. 5, the lock nut is of a rectangual stamped piece of metal having a central bore 37 formed between stamped out portions 37' that can deflect and which threadedly receive the screw. The nut is inserted laterally in a rectangual-shaped slot 38 until its central opening is in alignment with the radial passage 40 in which the screw 34 is received. It will be seen that the slot 38 effectively retains the nut 36 to allow the screw to be inserted and threaded into tightening engagement with the shaft.

Figure 6:
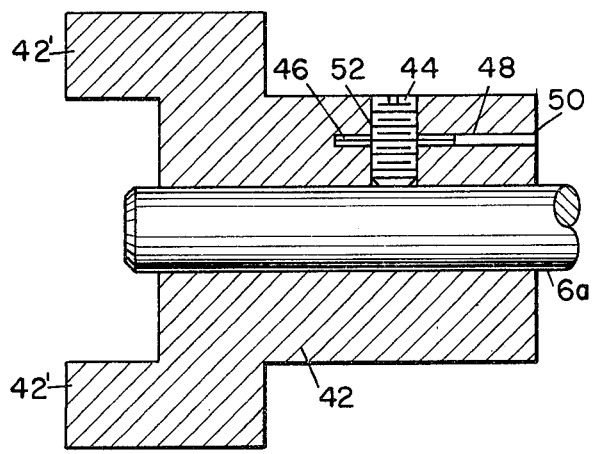
FIG. 6 is a sectional view of an alternate construction of the coupling head member containing screw-retaining means and an insertable threaded member for receiving the screw.
Figure 7:
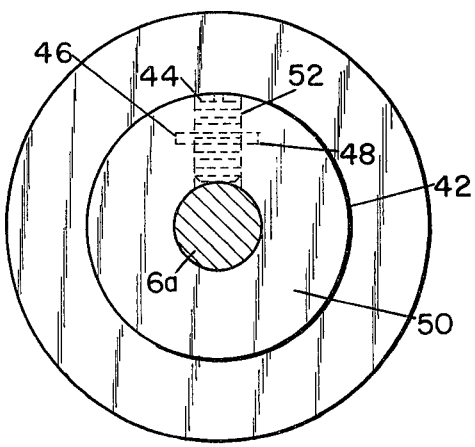
FIG. 7 is a partially sectional end view of the coupling head in FIG. 6.

FIGS. 6 and 7 illustrated another embodiment which is particularly suited for use in connection with shafts of particularly small diameter such as that shown at 6a. In shafts of such diameter, space occasionally will not permit the use of an intermediate tapered bushing element as described hereinabove. Accordingly, in such situations, a coupling head such as that shown at 42 is provided to be received directly on the shaft 6a. The coupling head is provided with rearwardly extending lugs 42' which are identical in form and function to the lugs 18 and 20 described in connection with the embodiment of FIGS. 1 to 4. The coupling head is retained on the shaft by a screw 44 threadedly received in a locking nut 46 whose construction is identical to that described in connection with FIGS. 3 and 4 above. In this embodiment, a rectangular shaped slot shown at 48 may be formed extending inwardly from the end face 50 of the coupling head. Radial opening 52 receives this tightening screw when the locking nut and its central opening therein are in alignment for accommodation of the screw as before described. It is to be noted that the screw retention means herein described provide a significantly improved retention means for molded plastic articles such as those with which the present invention is particularly concerned. The rectangular slots 38 and 48, for example, may be molded in their respective members as may be the radial bores 49 and 52. Consequently by an extremely single expedient of inserting the lock nuts in the already formed rectangular slots, a powerful and durable threading means is afforded in an otherwise unsatisfactory plastic material which greatly enhances the capability of firmly securing the coupling elements on their respective shafts.

Figure 8:
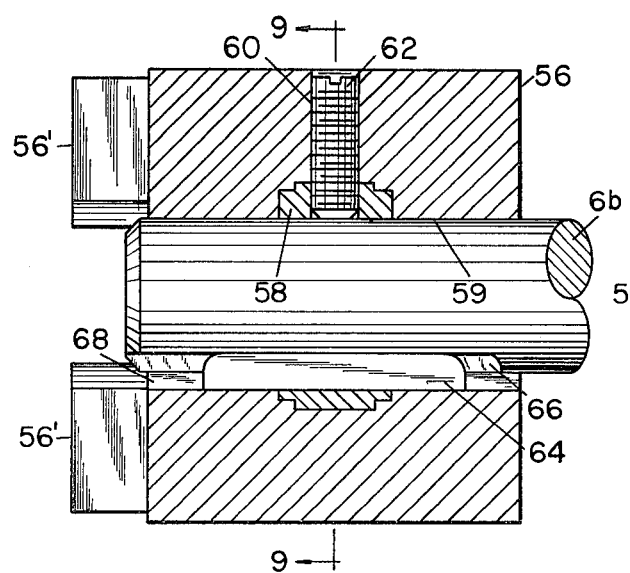
FIG. 8 is a further alternate embodiment showing a metal ring embedded in the coupling member.
Figure 9:
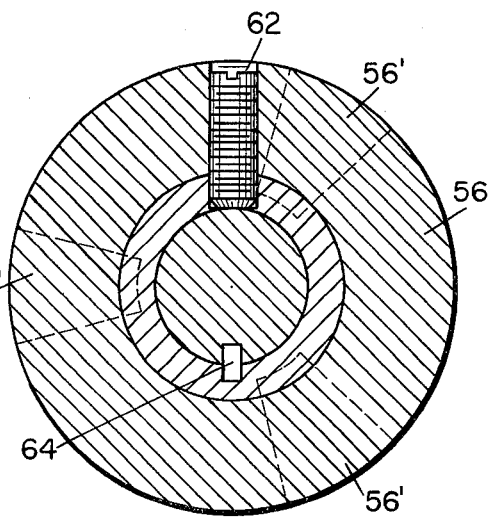
FIG. 9 is a sectional view taken along the line 9—9 in FIG. 8.
Figure 10:
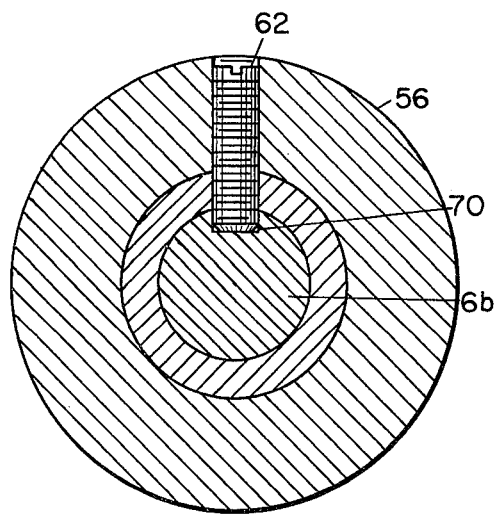
FIG. 10 is an alternate form of the construction shown in FIGS. 8 and 9.

A further embodiment is shown in FIGS. 8-10 of the drawings which illustrate an alternative form of metal insert in a coupling member similar to that illustrated in FIGS. 6 and 7. The plastic coupling member is shown at 56 which has the longitudinally projecting drive coupling lugs 56' that perform the same function as the lugs 18 and 20 in FIGS. 1 to 4. Embedded in the wall of the plastic coupling member is a metal ring 58 whose inner diameter coincides with the bore 59 in which the shaft 6b is received. The ring may be of aluminum, steel, brass or other conventional machinable metals and preferably is incorporated in the coupling member during the molding thereof.

A threaded bore 60 extends radially through the wall of the coupling member and the metal ring insert 58. Such bore may readily be formed ny drilling and tapping to form a suitable thread to receive the screw 62.

In the construction shown in FIGS. 8 and 9 the shaft and plastic coupling member are interconnected by a key 64 in the matching key ways 66 and 68. In the construction, therefore, the screw 62 serves primarily to secure the coupling element 56 at its prescribed longitudinal position on the shaft and to resist longitudinal driving stress.

Another alternate construction is shown in FIG. 10 in which the shaft 6b' is modified from that shown in FIGS. 8 and 9 by having a recess 70 which receives the end of the screw 62. Thus, the screw 62 serves both as a key element in slot 70 and also to secure the shaft and coupling elements against relative longitudinal displacement.

While the present invention has been particularly described in terms of specific embodiments thereof, it will be clear that numerous modifications and departures therefrom are permissible and that the instant invention is to be construed therefore and limited only by the scope and spirit of the claims appended hereto.

I claim:

1. A universal drive coupling element adapted to be mounted on a first, rotatable shaft to form a drive connection with a second shaft comprising, a cylindrical molded plastic member, a plurality of symmetrically disposed axially projecting forward end portions operable to form a slideable, torque transmitting, engagement with a similar coupling element oppositely disposed on a second shaft, a rearwardly extending cylindrical body member, an axially disposed bore extending inwardly from the rearward end of said member to slideably receive said first shaft therein, an annular metal member integrally molded in said rearward body member concentric with said shaft receiving bore, and having a central opening whose surface is contiguous with and forms a longitudinal segment intermediate the ends of said shaft receiving bore, a radially disposed threaded member extending through the wall of said rearward body member and said annular metal insert threadedly engaged with said metal insert and engagable with (a) the shaft in said bore, said first shaft contains a longitudinal key slot and having a projecting locking member in lateral engagement with said annular member that projects into said key slot to resist relative rotation of said coupling member and said first shaft.

2. A coupling member according to claim 1 wherein said locking member comprises a key extending radially into longitudinally extending confronting key slots in said shaft receiving bore and said first shaft.

* * * * *